June 20, 1967  R. J. LEE  3,327,291
SELF-SYNTHESIZING MACHINE
Filed Sept. 14, 1961  2 Sheets-Sheet 1
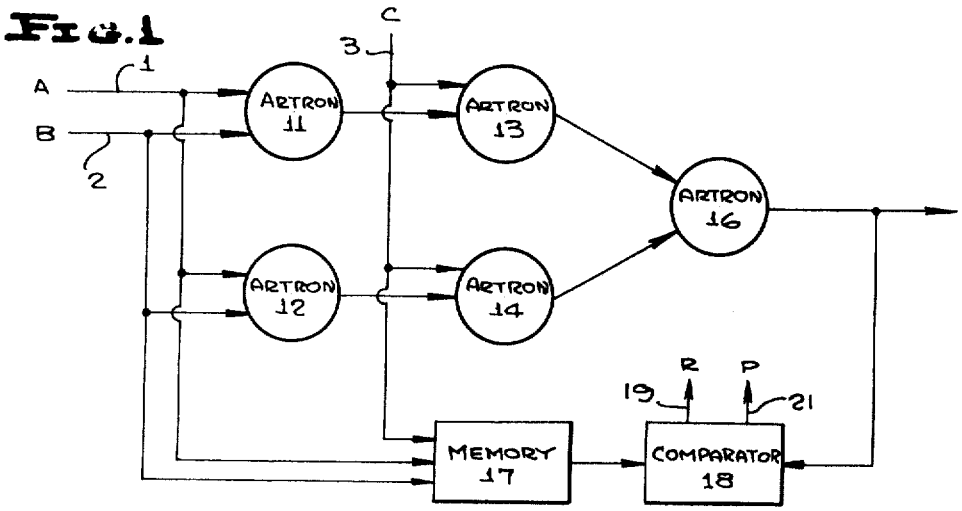
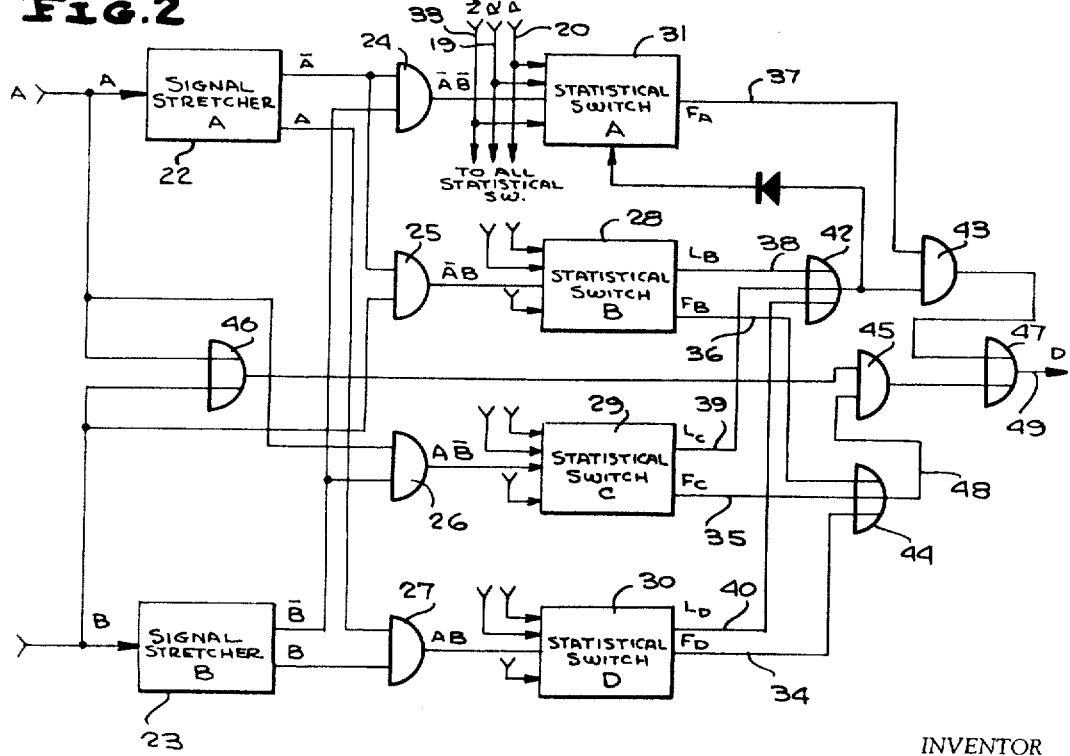
INVENTOR
ROBERT J. LEE
ATTORNEYS

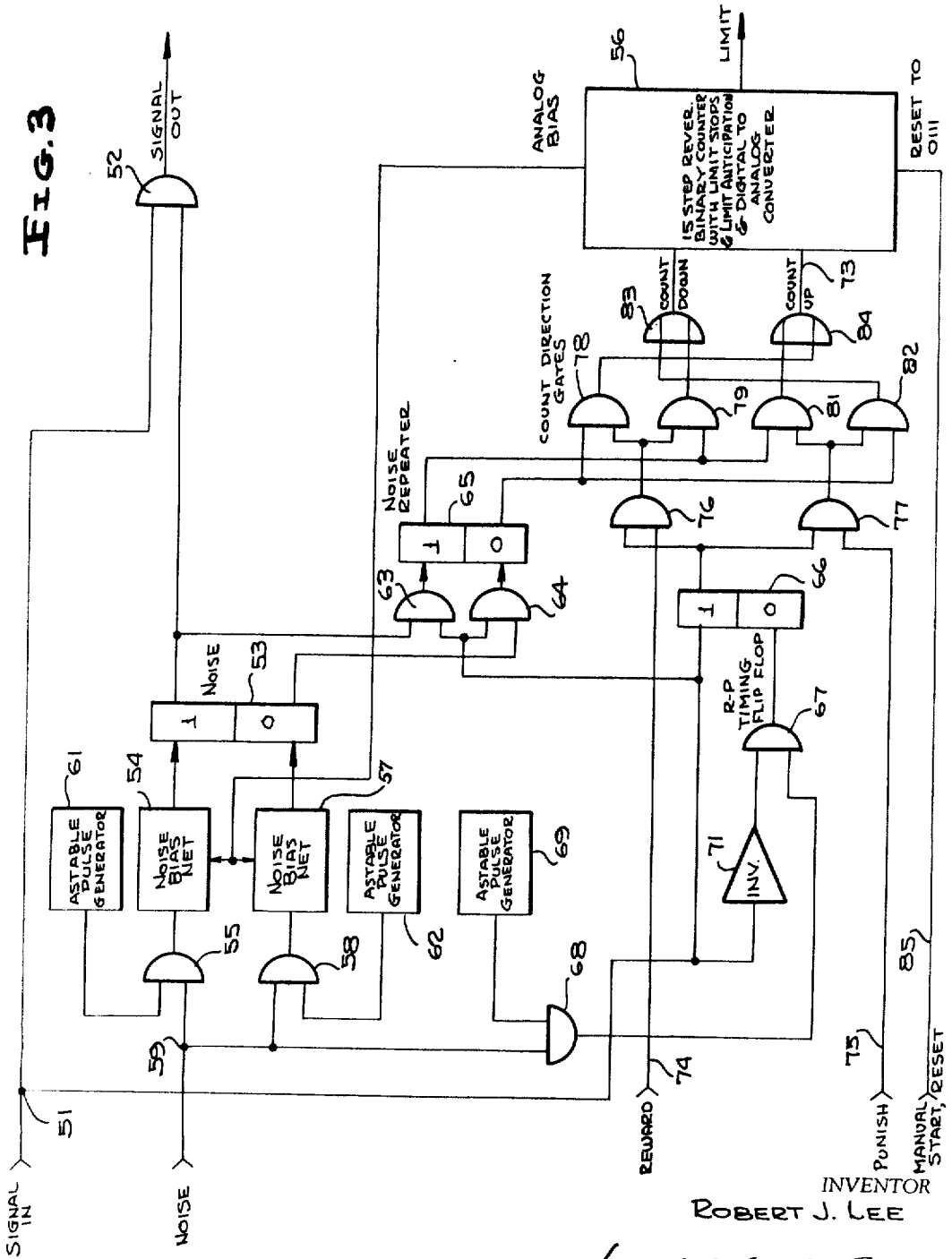

United States Patent Office 3,327,291
Patented June 20, 1967

3,327,291
SELF-SYNTHESIZING MACHINE
Robert J. Lee, Falls Church, Va.
(Rte. 5, Telegraph Road, Alexandria, Va. 22310)
Filed Sept. 14, 1961, Ser. No. 160,965
(Filed under Rule 47(b) and 35 U.S.C. 118)
13 Claims. (Cl. 340—172.5)

The present invention relates generally to machines for synthesizing themselves, generally termed learning machines, and more particularly to a learning machine capable of synthesizing itself to all possible Boolean functions by an iterative or trial and error process.

In the present invention, a plurality of artificial neuron type devices having two inputs and a single output are interconnected to synthesize a desired function in response to a plurality of input signals. Each element contains four logical gates to form all sixteen possible, non-redundant combinations of its two input signals A and B and their respective inversions $\bar{A}$ and $\bar{B}$. It is necessary to employ only four logical gates to generate all of the possible functions because the signals are combined in product form. Thus, if the input signals to a particular artificial neuron element, termed Artron, are A and B, the Artron output signal is a combination of the four AND or product functions, AB, $\bar{A}B$, $A\bar{B}$ and $\bar{A}\bar{B}$, capable of being formed from the input signals. These Boolean function signals are combinable in each Artron unit to form various OR functions.

A time modulated switch is included between each formed product and the Artron element output lead. Initially, each switch is operated in a random manner to be open and closed for equal periods of time. Teaching involves controlling the switch to a completely open or closed state. The input signals to an Artron network containing a plurality of Artron elements are combined to generate particular functions. The signals generated by the network are compared with the desired value of the network input signals to generate reward or punish signals which are supplied to each Artron element of the Artron network. A reward or punish signal is applied to only those switches which were activated during the previous operation by product signals equal to 1. Consequently, only one switch of each Artron element is activated by reward or punish signals at a time. If the network output signal is equal to the desired signal, the previous state of all switches having "1" input signals are rewarded. When a dissimilarity occurs between the network output signal and the desired signal, the previous state of all switches having "1" input signals are punished. The reward and punish signals control the length of time each switch is opened and closed to teach the machine. By successively repeating the operation with different input signal combinations, the network of Artrons is ultimately interconnected in accordance with the desired synthesized function so that each switch is finally driven to a position where it is opened or closed all of the time.

Each Artron element is initially adapted to pass only eight, rather than all sixteen, combinations of input signals because this increases the probability for certain Artrons to initially reach their final state.

The switches included in each Artron, termed "statistical" switches, include a biasing network responsive to the previous reward and punish signals. The biasing network is also responsive to a randomly occurring noise signal generated by a random noise generator of conventional type whose output voltage varies as a random function of time and whose mean output voltage is approximately equal to the mean analog bias level. When the switch has been rewarded and punished an equal number of times or is in its initial state, the noise signal is gated through the biasing network 50% of the time to cause the switch input signal to be passed half of the time. As the statistical switch is driven by the reward and punish signals, the biasing network is varied to pass either greater or lesser amplitudes of the noise signals to alter the switch state. After a sufficiently large number of input signals have been generated the statistical switches of each Artron are driven to their ultimate, completely opened or closed state. When this is accomplished the machine has learned the desired function.

In order for the machine to learn a new function it is merely necessary to reset the bias of each statistical switch to the median value. In this manner the function learned by the statistical switch is destroyed and it must start anew.

It is an object of the present invention to provide a self-synthesizing system utilizing an iterative process.

It is another object of the present invention to provide a self-synthesizing machine capable of assuming all possible Boolean functions of its input signals.

It is another object of the present invention to provide a network capable of synthesizing itself wherein the network contains a plurality of two input, one output elements which are connected together to generate all non-redundant combinations of Boolean functions of the network input pulses.

It is a further object of the present invention to provide a self synthesizing machine which establishes the desired network in response to reward and punish signals generated by comparing the ssytem output signals with a desired signal value.

An additional object of the present invention is to provide a self synthesizing network which is adapted to learn many different problems.

An additional object is to provide a two input-one output element capable of generating all non-redundant combinations of its input signals, which element is particularly adapted for use in learning machines.

Another object is to provide an element capable of synthesizing itself to all non-redundant functions of its input signals, wherein only certain functions are learned at a time to minimize initial incorrect learning.

Yet another object of the invention is to provide a new and improved time modulated switch particularly adapted for learning machines.

Still a further object is to provide a time modulated switch which compares its stored input signal with a feed back signal to control the open and closed switch periods.

An additional object is to provide a time modulated switch wherein the period of switch actuation is controlled by a variable amplitude signal.

Yet a further object is to provide a self synthesizing network having variably controlled connections between its input and output terminals.

The above and still further objects, features and advantages of the present invention will become apparent upon consideration of the following detailed description of one specific embodiment thereof, especially when taken in conjunction with the accompanying drawings, wherein:

FIGURE 1 is a flow or block diagram of a specific embodiment of the present invention designed to synthesize exemplary functions of three variables;

FIGURE 2 is a block diagram of one of the artificial neuron elements contained in the diagram of FIGURE 1; and FIGURE 3 is a block diagram of a statistical switch utilized in FIGURE 2.

Reference is now made to FIGURE 1 of the accompanying drawings, wherein input signals A, B and C are applied to terminals 1, 2 and 3, respectively. Each input signal is of the well-known binary type, capable of assuming only one of two states, "0" or "1."

The input signals A and B are applied to artificial neuron elements (Artrons) 11 and 12. The C input signal on terminal 3 is similarly applied to the input terminals of Artrons 13 and 14, as are the output signals of Artrons 11 and 12, respectively. Output signals of Artrons 13 and 14 are applied to a further Artron 16.

The A, B and C input signals are supplied simultaneously to a conventional programmable memory unit 17 for storage and readout of the desired function to be synthesized by the Artron network for the particular combination of input signals. The output signal of Artron 16, indicative of the function performed by the network containing Artrons 11, 12, 13, 14 and 16 on input signals A, B and C, is supplied to comparator 18, as is the output of memory 17. The comparator 18 actuates reward and punish signals on leads 19 and 21, in response to the similarity or dissimilarity of the memory 17 and Artron 16 output signals. When the Artron 16 output and memory 17 signals are alike, a signal is generated on lead 19 to reward the components in Artrons 11–14 and 16 which contributed to the correct answer while a dissimilarity in the output signals of Artron 16 and memory 17 results in a signal being generated on lead 21 to punish the components which contributed to the wrong answer.

As more fully described hereafter, each Artron contains four conventional gating elements which enable all possible non-redundant combinations of its input signals to be generated. Also, each Artron element is capable of assuming the 0 state at its output terminal regardless of the input signal supplied to it.

FIGURE 2 is a block diagram of a preferred embodiment of Artron 11 employed in FIGURE 1. The construction of Artrons 12–14 and 16 is identical to that illustrated in FIGURE 2 for Artron 11.

Input signals A and B are supplied to signal stretchers and inverters 22 and 23, respectively. The signal stretchers 22 and 23 generate rectangular pulses in response to spikes or other types of signals applied thereto. Each of the signal stretchers 22 and 23 has two output leads, one carrying the stretched signal in its original notation and the other carrying the stretched signal in its inverted notation. Signal stretchers 22 and 23 supply the signals $\bar{A}$ and $\bar{B}$ to AND gate 24 which generates an output signal commensurate with the function $\bar{A}\bar{B}$. AND gate 25 generates the signal $\bar{A}B$ in response to the $\bar{A}$ output signal of stretcher 22 and the B input signal. AND gate 26 is supplied with the A input signal and the $\bar{B}$ output signal of stretcher 23 to provide an output signal indicative of $A\bar{B}$. AND gate 27 forms the signal AB at its output terminal in response to the A and B signals from signal stretchers 22 and 23, respectively.

The output signals of AND gates 25, 26 and 27 are supplied to identical statistical switches 28, 29 and 30, respectively. The output signal of AND gate 24 is supplied to statistical switch 31 of slightly different configuration than statistical switches 28–30. Statistical switches 28–31 are simultaneously supplied with reward, punish and noise signals from leads 19, 20 and 33, respectively. The noise signal is derived from a suitable random noise generator as previously mentioned. However, only those switches previously having a "1" supplied thereto are activated by the reward and punish signals. Each of the statistical switches 28–31 is of the time modulated type wherein the period it remains open or closed is controlled by the reward, punish and noise signals supplied thereto. The switches 28–31 may achieve a limit either in the completely open or closed position dependent upon these signals and when the learning process is complete the switches are in one of these positions. When one of the switches 28–31 is repeatedly driven in one direction it becomes completely closed and enables the AND gate output signal fed to it to be always supplied to the function output leads 34, 35, 36 and 37. When a statistical switch has been repeatedly and successively driven in the opposite sense it becomes completely closed so that the output signal supplied thereto from its respective AND gate is never supplied to the function output leads.

When any of the switches 28–30 reaches a limit in either direction, a positive voltage is generated on its respective limit output lead 38, 39 or 40. This voltage is supplied through OR gate 42 to statistical switch 31 and AND gate 43. Reward and punish signals do not activate switch 31 until a limit voltage is gated through OR gate 42. In consequence switch 31 is maintained in the median position until that time so it passes the output signal of AND gate 24 one-half the time for a period shortly after a limit is reached by one of the switches 28–30. Once one of the statistical switches 28–30 reaches a limit, statistical switch 31 is activated by the reward and punish signals and its learning process begins.

The functional output signals on leads 34, 35 and 36 of statistical switches 30, 29 and 28, respectively, are supplied to OR gate 44 which energizes AND gate 45. Also supplied to AND gate 45 is a signal indicative of the Boolean function $A+B$. This $A+B$ signal is generated by OR gate 46 in response to the A and B input pulses so that the output combination derived from the output Artron (e.g. Artron 16 of FIGURE 1) are in time coincidence with the input signals to comparator 18 from memory 17. AND gate 43, responsive to the signals on lead 37 and to the output signal of OR gate 42, inhibits the output signal generated by statistical switch 31 until a limit is reached by at least one of the statistical switches 28–30. The output signals of AND gates 43 and 45 are combined in OR gate 47 to generate an output signal, D, indicative of the state of the Artron unit only while the input signals are generated. The reward and punish signals are applied between application of the input pulses and the generation of the output pulses. The statistical switches 28–31 store the output signals of AND gates 24–27 until the reward and punish signals are generated to control switch opening and closing times.

The Artron unit is capable of generating all sixteen non-redundant Boolean function combinations of signals that it is possible to generate in response to the signals A and B. The sixteen combinations include opening and closing of all statistical switches to indicate the "0" and "1" states, respectively. Only four AND gates are required to generate all possible non-redundant Boolean functions of A and B because of the identities $A+\bar{A}=1$ and $A+A=A$. To synthesize the Artron unit to generate the function $A+B$, statistical switches 28–30 are closed and the output signal of OR gate 47 becomes $A+B$. Since switches 28, 29 and 30 are closed the inputs to OR gate 44 become $\bar{A}B$, $A\bar{B}$, and AB, respectively. Therefore, the output function of OR gate 44 is $$\bar{A}B+A\bar{B}+AB=\bar{A}B+A(\bar{B}+B)=\bar{A}B$$
$$+A=(A+\bar{A})(A+B)=A+B$$

where the distributive rule of Boolean logic and the tautologies $\bar{B}+B=A+\bar{A}=1$ have been employed in the explanation. Thus, $A+B$ is combined with $A+B$ from OR gate 46 by AND gate 45 to yield $(A+B)(A+B)=A+B$ as an input to OR gate 47. Since switch 31 is open, by our original assumption in this example, no output is obtained from AND gate 43, so that the output function at lead 49 is simply $A\pm B$. Accordingly, to generate a signal on the output terminal of OR gate 47, indicative of the Boolean function $A+B$, it is necessary for the statistical switches 28, 29 and 30 all to be closed. To generate an output signal from OR gate 47 indicative of the Boolean function A, statistical switches 29 and 30, only are closed; to generate an output signal from OR gate 47 indicative of the Boolean function B, only statistical switches 28 and 30 are closed; to generate a signal on output lead 48 indicative of the Boolean function $\bar{A}B$, only statistical switch 28 is closed; to generate a signal indicative of the Boolean function $A\bar{B}$, only statistical switch 29 is closed; to generate a signal indicative of the Boolean function AB, only statistical switch 30 is closed.

Initially, the Artron network is capable of assuming only the first eight states designated in the following table.

SIXTEEN STATES OF THE ATRON ELEMENT

| States | Output Functions | Unconditioned Probabilities |
|---|---|---|
| 1 | A | 0.125 |
| 2 | B | 0.125 |
| 3 | AB | 0.125 |
| 4 | $A\bar{B}$ | 0.125 |
| 5 | $B\bar{A}$ | 0.125 |
| 6 | A+B | 0.125 |
| 7 | D=0 | 0.125 |
| 8 | $A\bar{B}+B\bar{A}$ | 0.125 |
| 9 | $\bar{A}\bar{B}$ | 0.000 |
| 10 | $\bar{A}\bar{B}+AB$ | 0.000 |
| 11 | $\bar{B}$ | 0.000 |
| 12 | $\bar{B}+A$ | 0.000 |
| 13 | $\bar{A}$ | 0.000 |
| 14 | $\bar{A}+B$ | 0.000 |
| 15 | $\bar{A}+\bar{B}$ | 0.000 |
| 16 | D=1 | 0.000 |

The ninth through sixteenth states cannot be assumed because they require the output signal of gate 24. However the output signal of gate 24 cannot be coupled to OR gate 47 because the output signal of statistical switch 31 is not coupled to OR gate 47 due to the inhibit action of AND gate 43 prior to any of the switches 28–30 reaching a limit. Not until one of the statistical switches 28–30 reaches either its positive or its negative limits is switch 31 closed to permit the Boolean functions indicative of the ninth through fifteenth states to be generated on lead 49.

Initially, the statistical switches 28–30 are opened and closed for equal periods of time on a random, statistical basis. It is possible for all of the switches 28–31 to be in a closed state so no information indicative of the input signals is generated to provide the D, seventh state. After one of the limits is reached it is possible for the Artron to assume state 16, equal to 1, if all of the statistical switches are closed in response to the reward, punish and noise signals.

Each statistical switch is rewarded or punished only after a "1" input signal is coupled to it. If a "1" is fed to a statistical switch while it is open and a reward signal is generated, the switch is biased to remain open for greater time periods; but if a punish signal is generated, the switch is biased to remain closed for greater time periods. If a "1" is fed to a statistical switch while it is closed and a reward signal is generated, the switch is biased to remain closed for greater time periods; but if a punish signal is generated, the switch is biased to remain open for greater time periods. "0" signals supplied to the switches do not control the reward and punish states because the elements are unable to recognize such signals from time intervals between signals. When a statistical switch reaches its limit in the positive and negative directions it is completely open or closed respectively. The noise signal which is combined with the bias level established in response to the reward and punish signals is of insufficient amplitude to close a statistical switch once it has reached its positive bias limit but no noise signal is necessary to close the statistical switch once it has reached its negative bias limit.

Reference is now made to FIGURE 3 of the drawings which discloses a particular embodiment of the statistical switches employed in the Artron elements. The input signal of each statistical switch derived from its respective AND gate 24–27 is applied to terminal 51 and AND gate 52, the output lead of which serves as the functional output lead of the statistical switch illustrated by leads 34–37 of FIGURE 2. AND gate 52 passes "1" signals on terminal 51 when noise flip-flop 53 is in its "1" state as determined by the condition of noise bias network 54. Noise bias network 54, which determines whether the switch is opened or closed, is supplied with variable amplitude, input spikes from AND gate 55 and a biasing voltage from counter-converter 56. Counter-converter 56 is a conventional 15 stage binary, reversible counter with weighting resistors connected in the output circuit of each stage to generate an analog voltage indicative of the counter state. The "0" state of flip flop 53 is supplied with input pulses from noise bias network 57 which is connected to the output of counter-converter 56 and the output lead of AND gate 58.

As the analog voltage output of counter-converter 56 varies from a central value between positive and negative fixed limits, the biases on networks 54 and 57 are varied. When the analog output voltage of counter-converter 56 is of low value, bias network 54 is adapted to pass low amplitude signals from AND gate 55 and the statistical switch is closed most of the time to pass the signal at terminal 51. At the same time, noise bias network 57 passes only high amplitude signals from AND gate 58. When a large analog voltage is generated by counter-converter 56, the biasing networks 54 and 57 are oppositely controlled. When the median value of counter-converter 56 is generated, biasing networks 54 and 57 are set to pass the same amplitude signals.

AND gates 55 and 58 are supplied with variable amplitude, low frequency noise signals from a noise source connected to terminal 59 and are respectively responsive to astable pulse generators 61 and 62. Pulse generators 61 and 62 have repetition rates so that noise bias networks 54 and 57 are supplied with an equal number of variable amplitude pulses at the times "1" input signals are generated at terminal 51. When each of the pulse generators 61 and 62 generates an ouput pulse, the noise signal on terminal 59 is gated to the respective biasing network 54 or 57. Generally the pulses of generators 61 and 62 occur at different times to prevent simultaneous actuation of both the 1 and 0 states of flip flop 53.

The output signals of the 1 and 0 states of flip flop 53 are supplied to AND gates 63 and 64, respectively. The other input terminals of AND gates 63 and 64 are responsive to the input signals on terminal 51. The output signals of AND gates 63 and 64 are respectively connected to the 1 and 0 states of noise repeater flip flop 65. Noise repeater flip flop 65 stores the state of the noise flip flop 53 after termination of the signal on terminal 51. This is necessary because the signal passed by noise bias networks 54 and 57 are capable of changing between termination of the signal on lead 51 and application of the reward and punish signals.

To erase the signal applied to the switch prior to occurrence of the next signal but subsequent to generation of the reward and punish signals, flip flop 66 is provided. The "1" state of flip flop 66 is directly supplied with the input signal on terminal 51 while the "0" state thereof is actuated by AND gate 67. One of the input signals coupled to AND gate 67 is supplied from AND gate 68 which is responsive to astable pulse generator 69 and the noise signal on terminal 59. The other input terminal of AND gate 67 is supplied by an inverter 71, responsive to the input signal on terminal 51.

When a "1" input signal is generated at terminal 51, flip flop 66 is set to its 1 state in response thereto. The flip flop 66 remains in this state at least until the signal on terminal 51 has terminated. This is insured by the inverter 71 which inhibits AND gate 67 until the signal on terminal 51 is "0." Gate 67 is actuated at a statistically random time after the "1" signal on terminal 51 terminates. This is accomplished with astable pulse generator 69 which gates the noise signal through AND gate 68 to AND gate 67. When the noise signal amplitude is sufficiently great to permit AND gate 68 to open when generator 69 is generating a pulse, AND gate 67 actuates the "0" state of flip flop 66 until the next "1" is generated at terminal 51.

The signals on leads 72 and 73 determine whether counter-converter 56 is to be driven in an upward or a downward direction. When a pulse is produced on lead 73, counter-converter 56 is driven in an upward direction causing bias network 54 to block lower amplitude signals while causing bias network 57 to pass lower amplitude signals. In an opposite manner, an input signal on lead 72 drives counter-converter 56 in the negative direction to reverse the tendency of networks 54 and 57 to pass high and low amplitude signals.

Generation of counting pulses on leads 72 and 73 is accomplished in response to reward and punish signals on leads 74 and 75, and the output signal of flip flops 65 and 66. The reward lead 74 is connected to one input terminal of AND gate 76 while the punish lead 75 is connected to one input terminal of AND gate 77. The other input terminals of AND gates 76 and 77 are simultaneously responsive to the "1" state of flip flop 66. Flip flop 66 is maintained in the "1" state by astable generator 69 for a sufficient period of time subsequent to termination of a "1" signal on terminal 51 to permit gating of the reward and punish signals on leads 74 and 75, respectively, through AND gates 76 and 77. If a "0" signal is applied to terminal 51, flip-flop 66 remains in the zero state and the reward and punish signals have no effect on counter-converter 56 and consequently no effect on the switch. The output signal of AND gate 76 is applied to AND gates 78 and 79 while the output signal of AND gate 77 is simultaneously applied to AND gates 81 and 82.

The "1" state output signal of flip flop 65, indicative of network 54 passing a signal and the statistical switch being closed at the time a "1" input signal is applied to terminal 51, is applied as the other input signals to AND gates 79 and 81. The output signal of the "0" state of flip flop 65, indicative of the same condition for noise bias network 57 but of the statistical switch being closed when a "1" is generated at terminal 51, is applied simultaneously to the other input terminals of AND gate 78 and 82. OR gate 83 is responsive to the output signals of AND gates 79 and 82 while OR gate 84 is responsive to the output signals of AND gates 78 and 81.

Counter-converter 56 is of the well known reversible type and is reset to its center position in response to an input signal on lead 85. In a preferred embodiment of the present invention, counter-converter 56 contains 15 stages 0 to 14, having a median count of seven. The first and last states of counter-converter 56 are provided with means to generate limit voltages outputs in statistical switches 28–30 of FIGURE 2 for energization of OR gate 42. To inhibit initial learning of switch 31, the output lead of its counter-converter 56 includes an "AND" gate which is actuated only after the limit voltages of one of the other switches 28–30 is generated.

OR gates 83 and 84 generates signals on leads 72 and 73 for decreasing and increasing the count of counter-converter 56. If the noise at terminal 59 is of sufficient amplitude to be passed through the bias established by counter-converter 56 on network 54 when a pulse is generated by generator 61, flip flop 53 assumes the "1" state. With flip flop 53 set in the "1" state, a "1" input signal on terminal 51 sets flip flop 65 to the "1" state. With flip flop 53 set in the "0" state in response to the noise amplitude and bias of network 57, a "0" is set in flip flop 65 when a "1" signal is generated at terminal 51.

As reward and punish signals are applied to terminals 74 and 75, the bias levels of networks 54 and 57 and consequently the periods of time flip flops 53 and 65 are set in the "1" or "0" state are varied. The combination of flip flop 65 being in the 1 state and a reward signal being generated on lead 74 results in an input signal being supplied to both input terminals of AND gate 79. Both input terminals of AND gates 78, 81 and 82 do not receive input signals under these conditions. Consequently, an output signal is generated by AND gate 79 and output signals are not generated by AND gates 78, 81 and 82.

The signal generated by AND gate 79 is supplied through OR gate 83 to the count down lead 72 of counter-converter 56 and drives the counter-converter 56 towards a position where network 54 passes more of the variable amplitude signals from AND gate 55 and network 57 passes fewer of the variable amplitude signals from AND gate 58. If, however, noise repeater flip flop 65 is set in the "1" state at the time a punsh signal is generated on lead 75, only AND gate 81 is actuated while AND gates 78, 79, and 82 remain unactuated. Actuation of AND gate 81 results in a signal being supplied through OR gate 84 to increase the analog voltage generated by counter-converter 56. The increased voltage of counter-converter 56 causes network 54 to pass only higher amplitude signals from AND gate 55 while causing biasing network 57 to pass lower amplitude signals from AND gate 58. In a similar manner, OR gates 83 and 84 are responsive to the output signals of AND gates 78 and 82 when flip flop 65 is set in the "0" state as a result of the statistical switch being closed when a "1" is generated at terminal 51.

For a more complete understanding of the operation of each Artron unit, an example of the manner in which the Boolean function $A+B$ is synthesized will now be given. The truth table for this function is:

|   | A | B | M = A+B |
|---|---|---|---------|
| 1 | 0 | 0 | 0 |
| 2 | 0 | 1 | 1 |
| 3 | 1 | 0 | 1 |
| 4 | 1 | 1 | 1 |

It is assumed that the A and B input signals are generated in time sequence according to the numbers 1, 2, 3 and 4 in the table and that the sequences are repeated until the function is synthesized. The first signal combination results in no learning since a "0" is generated by AND gates 28–30 and the output of AND gate 24 is not initially passed by AND gate 43. The second signal combination results in a "1" being applied to switch 28 by AND gate 25 and a "0" being fed to each of the other switches 29–31. It is assumed that the noise signal is of sufficient amplitude to set noise flip-flop 53 of statistical switch 28 to its "1" state when the "1" is generated by AND gate 25 so that a "1" is supplied to output lead 49. It is compared with the desired value for the second combination, "1," and a reward signal is generated. The reward signal is gated to count down lead 72 via gates 76, 79 and 83; gate 79 being actuated by noise repeater 65 which is set at the "1" value. Actuation of lead 72 causes the output voltage of counter-converter 56 to be decreased from the seventh to the sixth stage. This reduces the bias of network 54 so lower amplitude signals are passed thereby and raises the bias of network 57 so signals of only higher amplitude are passed by it. Accordingly, the switch 28 is closed more of the time, as desired. No other statistical switch is affected since no other switch had a "1" fed to it just prior to generation of the reward signal.

In response to the third sequence, AND gate 26 generates a "1" and AND gates 25, 27 and 28 generate zeros. It is assumed noise flip flop 53 of switch 29 is set to zero in response to the signal passed by bias network 57 at the time AND gate 26 generates a "1." In consequence, gate 52 does not pass the "1" input signal at terminal 51 and the output signal at terminal 49 is "0." This is compared with the desired value, "1," for this input signal combination, causing a punish signal to be generated. The punish signal is supplied to count down lead 72 via gates 77, 82 and 83; gate 82 being opened by the "0" state of flip flop 65. The analog output voltage of counter-converter 56 is decreased in response to the pulse on lead 72 and bias networks 54 and 57 cause switch 29 to be closed more frequently.

The same process takes place for switch 30 when the fourth combination is generated. The operation is continued by each of switches 28–30 seven times for this simple example, at which time each of them is biased to be completely closed.

When statistical switch 28 reaches its limit so it is closed all of the time, gate 43 is opened and switch 31 is permitted to learn. Assume switch 31 is closed the next time the first combination is generated, causing a "1" to be generated at lead 49. This is compared with the desired value, "0," and a punish signal is generated. This punish signal does not effect switches 28–30 since a "0" was just applied thereto. In switch 31, the punish signal is supplied to count up lead 73 via gates 77, 81 and 84; gate 81 being actuated by the "1" state of flip flop 65. In response to the signal on lead 73, the output voltage of counter-converter 56 increases to decrease the time noise flip flop 53 is in the "1" state and the closed time of statistical switch 31.

When the A and B input signals are both zero again, it is assumed noise flip flop 53 of switch 31 is set to zero and the switch is opened. This results in a "0" being generated on lead 49 and a reward signal on lead 74. The reward signal is supplied to count up lead 73 via gates 76, 78 and 84; gate 78 being opened by the "0" state of flip flop 65. This signal on lead 73 further increases the counter-converter 56 output signal to decrease the time statistical switch 31 remains closed.

It is now evident that switch 31 is actuated to remain open all of the time and switches 28–30 are actuated to remain closed all of the time to synthesize the Boolean function $A+B$. The statistical switches 28–30 are driven towards their correct states every time a "1" is supplied thereto regardless of whether they performed correctly in this simple example.

For a more complete understanding of the manner in which the present invention operates to synthesize a particular function of three variables, reference is again made to FIGURE 1. As an exemplary function desired to be synthesized the function $F=ABC+\overline{A}\overline{B}C+\overline{A}B\overline{C}+A\overline{B}\overline{C}$ is chosen. The truth table for this function is given in the following table.

|   | A | B | C | F |
|---|---|---|---|---|
| 1 | 0 | 0 | 0 | 0 |
| 2 | 0 | 0 | 1 | 1 |
| 3 | 0 | 1 | 0 | 1 |
| 4 | 0 | 1 | 1 | 0 |
| 5 | 1 | 0 | 0 | 1 |
| 6 | 1 | 0 | 1 | 0 |
| 7 | 1 | 1 | 0 | 0 |
| 8 | 1 | 1 | 1 | 1 |

Memory 17 is programmed in response to the A, B and C input signals to generate, as one input signal to comparator 18, the function F in accordance with the above table. Thus, memory 17 in effect serves as the "teacher" for the Artron network. When the output signal of Artron 16 coincides with the output signal of memory 17, reward signals are generated on lead 19 for each Artron. The input signals A, B and C may vary in a random manner or in the precise manner indicated by the table.

In order to completely synthesize the function F, it is necessary for the statistical switches responsive to the $\overline{A}B$ and $A\overline{B}$ generated signals of Artron 11 to be closed and the AB and $\overline{AB}$ switches of Artron 12 to be closed. For convenience, the output signals of Artrons 11 and 12 are designated as K and L, respectively. The statistical switches of Artron 13 responsive to the KC, $K\overline{C}$ and $\overline{K}C$ combined signals are completely closed as are the switches of Artron 14 responsive to $\overline{L}\overline{C}$, LC and $L\overline{C}$. To generate the function F, statistical switch 30 of Artron 16 is driven to the closed state by the reward and punish signals.

To drive the statistical switches of Artrons 11, 12, 13, 14 and 16 to the desired states approximately the same operations described for the single Artron of FIGURE 2 are followed. However, it is possible with the more complex network for some of the switches to be initially driven in the wrong direction. For example, assume the third combination is being generated while the statistical switches 28 of Artrons 11–14 are closed, as is statistical switch 30 of Artron 16. The A and B signals result in "1" signals being applied as one input to Artrons 13 and 14. Since the other input to Artrons 13 and 14 in response to the C signal is "1" and switches 28 are closed, both Artrons 13 and 14 generate a "1." The output signal of Artron 16 is "1" because its switch 30 is closed to pass the "1" input signals supplied thereto. A reward signal is generated because of the similarity between Artron 16 and memory 18 output signals. The reward signal drives statistical switches 28 of Artrons 11–14 and statistical switch 30 of Artron 16 toward their completely closed states. This is the desired condition for each of these switches, except switch 28 of Artron 12. While switch 28 of Artron 12 is temporarily driven in the wrong direction, it will probably not be driven in the wrong direction the next time a "1" signal is applied to it. In any event, by a successive iterative process, switch 28 of Artron 12 is eventually driven in the correct direction to reach its desired open state. In this manner each statistical switch of Artrons 11–14 and 16 is eventually driven to its correct state, causing the desired function to be synthesized and learned by the network.

It should now be appreciated why an attempt to learn all functions simultaneously was not attempted. It would result in many more incorrect learning tendencies of the statistical switches because of the much greater number of possible combinations generated. In some respects this is similar to the manner in which the animal brain functions to learn certain things at one time and others after the first objective is achieved.

To destroy the learning process of Boolean function F it is merely necessary to reset the counter-converters 56 of each statistical switch to their median value. The Artron network is then capable of relearning a different function but has no retention of the function it learned initially.

Of course it is to be understood the machine can be designed for any number of variables and is not limited to functions of only three variables. For example to teach the machine to generate a function having four variables, thirteen Artrons must be interconnected together. Four of these Artrons are responsive to the same pair of input signals. The output signals from these four Artrons are combined in four additional Artrons with the third input signal. The output signals of this second set of four Artrons are combined together in pairs to produce two output signals which are combined in separate Artrons with the fourth input signal. The output signals of the last-mentioned Artrons are combined together to generate the desired function. It should now be apparent how the Artrons are capable of being interconnected together in a pyramid type network to learn any function of a variable.

While I have described and illustrated one specific embodiment of my invention, it will be clear that variations of the details of construction which are specifically illustrated and described may be resorted to without departing from the true spirit and scope of the invention as defined in the appended claims.

I claim:

1. A system for gating an input signal between two preselected points in a circuit for variable time durations comprising, a source of variable amplitude analog signal, means for controlling the analog signal amplitude, a source of pure noise of randomly varying amplitude, and means responsive to said analog signal and to said noise for generating a control signal only when the amplitude of the noise is of predetermined polarity relative to the analog signal amplitude, and switch means coupling said two points and responsive to said control signal and to said input signal for gating said input signal between said two points for the duration of each control signal, whereby the probability that said input signal will be gated during any given time interval may be varied by control of said analog signal amplitude.

2. In combination, a network having $n$ input terminals, where $n$ is a positive integer greater than one, each of said terminals being responsive to a different binary signal, means responsive to the $n$ binary signals for generating second signals representing all non-redundant binary Boolean "and" functions of the $n$ binary signals, an OR gate selectively responsive to said second signals, a separate switch for selectively coupling each of said second signals to said OR gate, and means for controlling said switches in response to a comparison between signals deriving from said OR gate and a desired output signal of said network for the $n$ binary signals.

3. The combination of claim 2 wherein $n=2$.

4. The combination of claim 2 including means for controlling only those switches having binary input signals of a predetermined value in response to each of said comparisons.

5. A self synthesizing system comprising a logic gate responsive to at least one input signal, said gate deriving a predetermined binary output signal when the input thereof achieves a predetermined value, switch means for selectively feeding said binary signal to a first output terminal, means for coupling the signal deriving from said first output terminal to a system output terminal, means for deriving a control signal in response to comparisons of said system output signal with the desired output signal of the system for the particular input signal, a completely random noise source, said switch means having a variable bias level for controlling coupling of said binary signal to said first output terminal, and means responsive to said noise source and said control signal for varying the bias level of said switch means.

6. The system of claim 5 wherein said control signal deriving means includes; means for deriving signals of first and second polarities when said system output signal and said desired output signal are alike and different, respectively, and means for accumulating said first and second polarity signals to derive said control signal.

7. A self-synthesizing network adaptive to organize itself to form a desired logical function of a plurality of binary signals applied thereto, said network comprising a plurality of input terminals each for receiving a respective one of said plurality of binary signals, means for applying said binary signals to respective ones of said input terminals repetitively at predetermined time intervals, a plurality of artificial neuron elements interconnected in predetermined manner to each other and to said input terminals, each of said neuron elements including means having a plurality of possible operating states for generating any one of all possible non-redundant Boolean logical functions of said binary input signals, means for storing said desired logical function of said binary input signals, a network output terminal for receiving the combined output functions generated by said interconnected neuron elements in response to said binary input signals, means for comparing the combined function present at said output terminal with the stored desired logical function and for generating a reward signal indicative of exact correspondence therebetween or a punish signal indicative of lack of exact correspondence therebetween, each of said neuron elements being responsive to said reward and punish signals to maintain or to vary its operating state in accordance therewith prior to the next successive repetition of said binary signals applied to said input terminals, so that each neuron element is driven toward an operating state which, in combination with the operating state of each of the other neuron elements, repetitively produces the desired logical function at said output terminal in response to repetitive application of said binary input signals to said network.

8. The combination according to claim 7 wherein said means having a plurality of operating states in each neuron element includes a plurality of statistical switches each having a bias network, means for controlling the bias level of said bias network in response to said reward and punish signals, means for applying a random noise signal to said bias network, said bias network being arranged to pass a portion of said noise signal having an amplitude greater than said bias level and to prevent the passage of those portions of the noise signal of lesser amplitude than said bias level, and means responsive to the passage of noise signal by said bias network to close the associated statistical switch and thereby to pass the signal applied to said last-named switch.

9. The combination according to claim 8 wherein each neuron element further includes a plurality of logical gate circuits interconnected to receive binary signals passed by statistical switches therein for combining said last-named signals to form one of said possible non-redundant Boolean logical functions depending respectively on which of said statistical switches are closed.

10. The combination according to claim 9 wherein each of said neuron elements includes an output terminal, and said plurality of logical gate circuits are coupled to supply the Boolean logical function formed thereby to the respective output terminal of their neuron element, and wherein each neuron element further includes means for initially inhibiting the application of selected ones of said possible Boolean logical functions to said last-named output terminal to increase the speed at which said network organizes itself to form said desired logical function.

11. The combination according to claim 10 wherein each neuron element further includes means for generating the negation of each binary input signal applied thereto, and further logical gate means for combining each of said last-named binary signals with each other and with the negations thereof in non-redundant manner for application to the statistical switches of said neuron element.

12. A system for connecting an input circuit with an output circuit to provide a conductive path for signal therebetween over selectively variable time intervals, said system comprising a source of bias voltage of variable level; a source of noise voltage of randomly varying level; means for comparing the level of said noise voltage with the level of said bias voltage, and for generating a control signal when and throughout the time interval that said noise voltage level exceeds said bias voltage; means normally nonconductively coupling said input circuit and said output circuit and responsive to said control signal for completing said conductive path for the duration of each control signal only; and means for varying the level of said bias voltage in either direction relative to a predetermined reference level to selectively control the probability that a control signal will be generated and the time interval over which each control signal is generated.

13. The combination according to claim 1 wherein said input signal comprises binary signals each having a pair of values and applied to said switch means in random sequence; and wherein is further included first storage means for storing the binary signal value desired to be gated by said switch means, means for comparing the value of the gated signal with said desired value and for generating a first signal indicative of correspondence therebetween or a second signal indicative of lack of correspondence therebetween; and wherein said means for controlling includes means for increasing the amplitude of said analog signal in response to one of said first and second signals and for decreasing the amplitude of said analog signal in response to the other of said first and second signals.

References Cited

UNITED STATES PATENTS

| | | | |
|---|---|---|---|
| 2,947,971 | 8/1960 | Glauberman | 340—347 |
| 3,046,545 | 7/1962 | Westerfield | 235—181 |
| 3,103,648 | 9/1963 | Hartmanis | 340—172.5 |
| 3,114,884 | 12/1963 | Jakowatz | 340—172.5 |

OTHER REFERENCES

Pages 83–86—Publication: Culbertson, Mathematics and Logic For Digital Devices, Van Nostrand, 1958.

Pages 38–54, Sept. 9, 1960—Corneretto, Electronics Learns from Biology, Electronic Design.

Pages 5–22, January 1961—Publication: Computation, Behavior and Structure in Fixed and Growing Automata by A. W. Burks, Behavorial Science.

ROBERT C. BAILEY, *Primary Examiner.*

MALCOLM A. MORRISON, W. M. BECKER, R. ZACHE, *Assistant Examiners.*